US010466357B1

(12) United States Patent
 Dietz

(10) Patent No.: US 10,466,357 B1
(45) Date of Patent: Nov. 5, 2019

(54) OPTICAL MEASURING DEVICE

(71) Applicant: Precitec Optronik GmbH, Neu-Isenburg (DE)

(72) Inventor: Christoph Dietz, Obertshausen (DE)

(73) Assignee: Precitec Optronik GmbH (DE)

( * ) Notice: Subject to any disclaimer, the term of this patent is extended or adjusted under 35 U.S.C. 154(b) by 0 days.

(21) Appl. No.: 16/361,955

(22) Filed: Mar. 22, 2019

(30) Foreign Application Priority Data

Dec. 4, 2018 (DE) .................. 10 2018 130 901

(51) Int. Cl.
 *G01S 17/46* (2006.01)
 *G01B 11/06* (2006.01)
(52) U.S. Cl.
 CPC .............. *G01S 17/46* (2013.01); *G01B 11/06* (2013.01); *G01B 2210/50* (2013.01)
(58) Field of Classification Search
 CPC ...... G01S 17/46; G01B 11/16; G01B 2210/50
 USPC .................................................. 356/614–640
 See application file for complete search history.

(56) References Cited

U.S. PATENT DOCUMENTS

| | | |
|---|---|---|
| 4,861,131 A | 8/1989 | Bois et al. |
| 5,276,631 A | 1/1994 | Popovic et al. |
| 5,392,124 A | 2/1995 | Barbee |
| 5,532,815 A | 7/1996 | Kipman et al. |
| 5,691,540 A | 11/1997 | Halle et al. |
| 5,905,572 A | 5/1999 | Li |
| 6,057,920 A | 5/2000 | Fercher et al. |
| 6,098,895 A | 8/2000 | Walzel et al. |
| 6,099,522 A | 8/2000 | Knopp et al. |
| 6,396,069 B1 | 5/2002 | MacPherson et al. |

(Continued)

FOREIGN PATENT DOCUMENTS

| | | |
|---|---|---|
| CN | 101365375 | 2/2009 |
| CN | 101393015 | 3/2009 |

(Continued)

OTHER PUBLICATIONS

Precitec Optronik GmbH; French Preliminary Search Report and Written Opinion for serial No. FR1253225, dated Nov. 13, 2013, 10 pgs.

(Continued)

*Primary Examiner* — Tri T Ton
(74) *Attorney, Agent, or Firm* — Taylor English Duma LLP

(57) ABSTRACT

A measuring device includes a light source that emits light of a plurality of wavelengths, in particular a continuous spectrum, a first confocal diaphragm, through which light from the light source passes, and an optical illuminating/imaging system having a first splitting optical element designed as a prism or grating. The optical illuminating/imaging system, which is designed such that the light enters the first splitting optical element collimated, includes a first lens system having at least one first lens that is spatially separated from the first splitting optical element, the effective focal length of the first lens system being significantly different for different wavelengths, and the optical illuminating/imaging system being designed such that focus points of different wavelengths are formed at different locations along a line segment. The measuring device is configured to measure an object that intersects with the line segment and reflects at least a part of the light.

12 Claims, 5 Drawing Sheets

(56) References Cited

U.S. PATENT DOCUMENTS

| | | | |
|---|---|---|---|
| 6,672,943 B2 | 1/2004 | Vogtmann et al. |
| 6,673,654 B2 | 1/2004 | Ohno et al. |
| 6,686,270 B1 | 2/2004 | Subramanian et al. |
| 6,768,552 B2 | 7/2004 | Takahashi et al. |
| 6,806,969 B2 | 10/2004 | Clifford, Jr. et al. |
| 6,887,126 B2 | 5/2005 | Brouillette et al. |
| 6,897,964 B2 | 5/2005 | Takahashi et al. |
| 7,271,916 B2 | 9/2007 | Jasapara et al. |
| 7,306,696 B2 | 12/2007 | Lian et al. |
| 7,307,735 B2 | 12/2007 | Hecht et al. |
| 7,443,517 B2 | 10/2008 | Sawabe et al. |
| 7,477,401 B2 | 1/2009 | Marx et al. |
| 7,525,732 B2 | 4/2009 | Uehara et al. |
| 7,652,774 B2 | 1/2010 | Lian et al. |
| 7,705,995 B1 | 4/2010 | Johs |
| 7,738,113 B1 | 6/2010 | Marx et al. |
| 7,826,068 B2 | 11/2010 | Czerkas |
| 7,853,429 B2 | 12/2010 | Fettig et al. |
| 8,716,039 B2 | 5/2014 | Dusemund |
| 8,982,339 B2 | 3/2015 | Schonleber et al. |
| 9,295,391 B1 | 3/2016 | Tearney |
| 9,297,645 B2 | 3/2016 | Schonleber |
| 9,494,409 B2 | 11/2016 | Schonleber |
| 9,500,471 B2 | 11/2016 | Michelt |
| 9,677,871 B2 | 6/2017 | Schonleber |
| 9,982,994 B2 | 5/2018 | Schonleber et al. |
| 10,228,551 B1 * | 3/2019 | Dietz ................ G02B 21/0032 |
| 10,234,265 B2 | 3/2019 | Schönleber et al. |
| 2002/0148983 A1 | 10/2002 | Inoue et al. |
| 2002/0153500 A1 | 10/2002 | Fordahl et al. |
| 2003/0016353 A1 | 1/2003 | Detalle et al. |
| 2003/0090671 A1 | 5/2003 | Takahashi et al. |
| 2004/0021874 A1 | 2/2004 | Shimmick |
| 2004/0185582 A1 | 9/2004 | Kueny |
| 2004/0262529 A1 | 12/2004 | Yoshida et al. |
| 2005/0003642 A1 | 1/2005 | Hecht et al. |
| 2005/0073692 A1 | 4/2005 | De Groot |
| 2005/0140981 A1 | 6/2005 | Waelti |
| 2005/0237537 A1 | 10/2005 | Leizerson et al. |
| 2005/0248771 A1 | 11/2005 | Eussen et al. |
| 2006/0132790 A1 | 6/2006 | Gutin |
| 2006/0194419 A1 | 8/2006 | Araki |
| 2007/0046948 A1 | 3/2007 | Podoleanu et al. |
| 2007/0086018 A1 | 4/2007 | Shih et al. |
| 2007/0148792 A1 | 6/2007 | Marx et al. |
| 2007/0188765 A1 | 8/2007 | Zhao et al. |
| 2007/0231717 A1 | 10/2007 | Rivers et al. |
| 2007/0258095 A1 | 11/2007 | Oliver et al. |
| 2008/0013078 A1 | 1/2008 | Podoleanu et al. |
| 2008/0013960 A1 | 1/2008 | Tearney et al. |
| 2008/0151237 A1 | 6/2008 | Lian et al. |
| 2009/0031792 A1 | 2/2009 | Fan et al. |
| 2009/0059239 A1 | 3/2009 | Hoffmann et al. |
| 2009/0078888 A1 | 3/2009 | Namba et al. |
| 2009/0128824 A1 | 5/2009 | Leitgeb et al. |
| 2009/0250635 A1 | 10/2009 | Sykora et al. |
| 2009/0257065 A1 | 10/2009 | Hauger et al. |
| 2009/0268020 A1 | 10/2009 | Buckland et al. |
| 2009/0268209 A1 | 10/2009 | Waelti et al. |
| 2009/0273782 A1 | 11/2009 | Yoo et al. |
| 2010/0007894 A1 | 1/2010 | Suehira |
| 2010/0051068 A1 | 3/2010 | Miyanari |
| 2010/0110376 A1 | 5/2010 | Everett et al. |
| 2010/0157308 A1 | 6/2010 | Xie |
| 2010/0265493 A1 | 10/2010 | Jiang et al. |
| 2010/0283842 A1 | 11/2010 | Guissin et al. |
| 2010/0321671 A1 | 12/2010 | Marx et al. |
| 2011/0085136 A1 | 4/2011 | Ferguson et al. |
| 2011/0180521 A1 | 7/2011 | Quitter et al. |
| 2011/0222070 A1 | 9/2011 | Nagai et al. |
| 2011/0292375 A1 | 12/2011 | Marx et al. |
| 2012/0050723 A1 | 3/2012 | Emtman et al. |
| 2012/0200859 A1 | 8/2012 | Breitenstein et al. |
| 2012/0206710 A1 * | 8/2012 | Niemela ............ G01B 11/0633 356/4.07 |
| 2012/0238869 A1 | 9/2012 | Schmitt et al. |
| 2012/0257207 A1 | 10/2012 | Marx et al. |
| 2012/0257213 A1 | 10/2012 | Schonleber |
| 2012/0320380 A1 | 12/2012 | Schonleber |
| 2013/0034918 A1 | 2/2013 | Dusemund et al. |
| 2013/0070732 A1 | 3/2013 | Noh et al. |
| 2013/0120740 A1 | 5/2013 | Schonleber |
| 2013/0162978 A1 | 6/2013 | Yazdanfar et al. |
| 2014/0368830 A1 | 12/2014 | Michelt |
| 2015/0260504 A1 | 9/2015 | Schonleber |
| 2017/0227350 A1 | 8/2017 | Sarunic et al. |
| 2017/0234678 A1 | 8/2017 | Schonleber et al. |
| 2018/0164089 A1 | 6/2018 | Schonleber et al. |
| 2019/0137626 A1 | 5/2019 | Dietz |

FOREIGN PATENT DOCUMENTS

| | | |
|---|---|---|
| CN | 102209878 | 10/2011 |
| DE | 19525770 | 8/1996 |
| DE | 69622943 | 3/2003 |
| DE | 10319843 | 4/2004 |
| DE | 102004011189 | 9/2005 |
| DE | 102004052205 | 5/2006 |
| DE | 102005036719 | 2/2007 |
| DE | 60028709 | 5/2007 |
| DE | 102005052743 | 5/2007 |
| DE | 102006034244 | 1/2008 |
| DE | 102007048295 | 4/2009 |
| DE | 102008041062 | 4/2009 |
| DE | 102010000079 | 1/2010 |
| DE | 102008049821 | 4/2010 |
| DE | 10325942 | 9/2010 |
| DE | 102010015944 | 7/2011 |
| DE | 102010016862 | 9/2011 |
| DE | 102011081596 | 4/2012 |
| DE | 102011051146 | 10/2012 |
| DE | 102011055735 | 5/2013 |
| DE | 102012111008 | 5/2014 |
| DE | 102013008269 | 11/2014 |
| DE | 202008018535 | 7/2015 |
| EP | 0547227 | 6/1993 |
| EP | 0905476 | 3/1999 |
| EP | 1018632 | 7/2000 |
| EP | 1977850 | 10/2008 |
| EP | 2159535 | 3/2010 |
| EP | 2076733 | 12/2012 |
| FR | 2950441 | 3/2011 |
| GB | 1105819 | 3/1968 |
| JP | 6065963 | 4/1988 |
| JP | H07311019 | 11/1995 |
| JP | H10335288 | 12/1998 |
| KR | 1020080112436 | 12/2008 |
| TW | 200712585 | 4/2007 |
| TW | 200937005 | 9/2009 |
| WO | 1997027613 | 7/1997 |
| WO | 2006028926 | 3/2006 |
| WO | 2006084279 | 8/2006 |
| WO | 2007060441 | 5/2007 |
| WO | 2008010996 | 1/2008 |
| WO | 2011086490 | 7/2011 |
| WO | 2011141867 | 11/2011 |
| WO | 2013070732 | 5/2013 |
| WO | 2014076649 | 5/2014 |

OTHER PUBLICATIONS

Malta, D. et al.; "Fabrication of TSV-Based Silicon Interposers", RTI International, publicly available prior to Oct. 11, 2012, 6 pgs.

Knuttel, Dr. Alexander; "Non-compact Roughness and 3D Topography Evaluation of grinded Wafers down to nm lever", Dec. 1, 2010, 25 pgs.

Jakob, Dr. G., "Coaxial interferometric measuring of layer thickness", Optical Measuring, Sonderdruck aus Photonik Mar. 2000; 4 pgs.

ISIS Sentronics Gmbh Data Sheet, "StraDex a3 sensor" and "StraDex f2-80 sensor head", publicly available prior to Oct. 11, 2012, 3 pgs.

(56) References Cited

OTHER PUBLICATIONS

Vakhtin et al.; "Common-path interferometer for frequency-domain optical coherence tomography"; Applied Optics, vol. 42, No. 34, S. 6953-6957, published Dec. 1, 2003, 6 pgs.
Huang et al.; "Optical coherence tomography", Science, vol. 254, No. 5035, S. 1178-1181, published Nov. 22, 1991, 4 pgs.
Rowland, et al. "Impact of polymer film thickness and cavity size on polymer flow during embossing: toward process design rules for nanoimprint lithography", Journal of Micromechanics and Microengineering, 2005, vol. 15, pp. 2414-2425., 12 pgs.
Niklaus, et al. "Adhesive Wafer Bonding", Journal of Applied Physics, Applied Physics Reviews—Focused Review, 2006, vol. 99, No. 1, pp. 031101.1-031101.28, 29 pgs.
Lucke, et al.; Article entitled: "Mikrooptische Sensoren nach dem chromatisch konfokalen Messprinzip", Forschungszentrum Karlsruhe GmbH, Karlsruhe 2006, 23 pgs.
Taiwan Office Action for serial No. 101121622, filed Jun. 15, 2012, dated May 21, 2014, 15 pgs.
Micro-Epsilon USA; Brochure for Confocal Chromatic Measurement System, cited in the German Examination Report for serial No. 10 2014 008 584.8, dated Apr. 21, 2016, 11 pgs.
Micro-Epsilon; Article entitled: ""New Generation of Confocal Measurement Technology"", located at <http://www.microepsilon.com/press/release/PR231confocalDT/index.html?sLang=us>, accessed on Jul. 7, 2016, 2 pgs.
Precitec Optronik GmbH; German Examination Report for serial No. 102014008584.8, dated Apr. 21, 2016, 13 pgs.
German Examination Report for German Application No. DE102013010030.5, filed Jun. 17, 2013, dated Feb. 28, 2014, 12 pgs.
Schonleber, Martin; Issue Notification for U.S. Appl. No. 15/433,173, filed Feb. 15, 2017, dated Feb. 27, 2019, 1 pg.
Schönleber, Martin; Notice of Allowance for U.S. Appl. No. 15/433,173, filed Feb. 15, 2017, dated Nov. 20, 2018, 15 pgs.
Dietz, Christoph; German Examination Report for serial No. 10 2017 126 310.1, filed Nov. 9, 2017, dated Jul. 13, 2018, 14 pgs.
Schoenleber; German Examination Report for serial No. DE102012102826, dated Sep. 28, 2012, 14pgs.
Schonleber, Martin; Corrected Notice of Allowability for U.S. Appl. No. 13/440,434, filed Apr. 5, 2012, dated Mar. 1, 2016, 6 pgs.
Schonleber, Martin; Final Office Action for U.S. Appl. No. 13/440,434, filed Apr. 5, 2012, dated Feb. 10, 2014, 20 pgs.
Schonleber, Martin; Issue Notification for U.S. Appl. No. 13/440,434, filed Apr. 5, 2012, dated Mar. 9, 2016, 1 pg.
Schonleber, Martin; Non Final Office Action for U.S. Appl. No. 13/440,434, filed Apr. 5, 2012, dated Oct. 14, 2014, 16 pgs.
Schonleber, Martin; Non-Final Office Action for U.S. Appl. No. 13/440,434, filed Apr. 5, 2012, dated Jun. 25, 2015, 21 pgs.
Schonleber, Martin; Non-Final Office Action for U.S. Appl. No. 13/440,434, filed Apr. 5, 2012, dated Sep. 24, 2013, 34 pgs.
Schonleber, Martin; Notice of Allowance for U.S. Appl. No. 13/440,434, filed Apr. 5, 2012, dated Jan. 13, 2016, 11 pgs.
Schonleber, Martin; Notice of Allowance for U.S. Appl. No. 13/440,434, filed Apr. 5, 2012, dated Feb. 12, 2015, 9 pgs.
Schonleber, Martin; Notice of Allowance for U.S. Appl. No. 13/440,434, filed Apr. 5, 2012, dated Sep. 23, 2015, 11 pgs.
Schonleber; United Kingdom Search Report for serial No. GB11058195, filed Apr. 6, 2011, dated Jul. 23, 2012, 4 pgs.
Dusemund, Claus; Issue Notification for U.S. Appl. No. 13/521,736, filed Jul. 11, 2012, dated Apr. 16, 2014, 1 pg.
Dusemund, Claus; Non-Final Office Action for U.S. Appl. No. 13/521,736, filed Jul. 11, 2012, dated Jan. 23, 2013, 18 pgs.
Dusemund; International Search Report and Written Opinion for serial No. PCT/IB2011/050091, filed Jul. 10, 2011, dated Apr. 12, 2011, 3 pgs.
Extended European Search Report for serial No. EP12172165, dated Oct. 24, 2012, 5 pgs.
Dusemund; International Preliminary Report on Patentability for serial No. PCT/IB2011/050091, filed Jan. 10, 2011, dated Aug. 16, 2012, 14 pgs.
Dusemund, Claus; Notice of Allowance for U.S. Appl. No. 13/521,736, filed Jul. 11, 2012, dated Dec. 27, 2013, 8 pgs.
Precitec Optronik GMBH; Korean Notice of Preliminary Rejection for serial No. 10-2012-0064923, filed Jun. 18, 2012, dated Oct. 30, 2014, 11 pgs.
Schonleber, Martin; Applicant Interview Summary for U.S. Appl. No. 13/525,184, filed Jun. 15, 2012, dated Oct. 27, 2015, 3 pgs.
Schonleber, Martin; Final Office Action for U.S. Appl. No. 13/525,184, filed Jun. 15, 2012, dated Oct. 7, 2014, 17 pgs.
Schonleber, Martin; Final Office Action for U.S. Appl. No. 13/525,184, filed Jun. 15, 2012, dated Jul. 28, 2015, 32 pgs.
Schonleber, Martin; Issue Notification for U.S. Appl. No. 13/525,184, filed Jun. 15, 2012, dated Oct. 26, 2016, 1 pg.
Schonleber, Martin; Non-Final Office Action for U.S. Appl. No. 13/525,184, filed Jun. 15, 2012, dated Feb. 25, 2014, 16 pgs.
Schonleber, Martin; Non-Final Office Action for U.S. Appl. No. 13/525,184, filed Jun. 15, 2012, dated Dec. 31, 2015, 21 pgs.
Schonleber, Martin; Non-Final Office Action for U.S. Appl. No. 13/525,184, filed Jun. 15, 2012, dated Feb. 19, 2015, 21 pgs.
Schonleber, Martin; Notice of Allowance for U.S. Appl. No. 13/525,184, filed Jun. 15, 2012, dated Jul. 12, 2016, 21 pgs.
Schonleber; German Examination Report for serial No. DE102011051146, filed Oct. 4, 2012, dated Jan. 19, 2012, 6 pgs.
Schonleber, Martin; Final Office Action for U.S. Appl. No. 13/667,809, filed Nov. 2, 2012, dated Sep. 16, 2013, 9 pgs.
Schonleber, Martin; Issue Notification for U.S. Appl. No. 13/667,809, filed Nov. 2, 2012, dated Feb. 25, 2015, 1 pg.
Schonleber, Martin; Non-Final Office Action for U.S. Appl. No. 13/667,809, filed Nov. 2, 2012, dated Apr. 15, 2013; 12 pgs.
Schonleber, Martin; Non-Final Office Action for U.S. Appl. No. 13/667,809, filed Nov. 2, 2012, dated Apr. 24, 2014; 8 pgs.
Schonleber, Martin; Notice of Allowance for U.S. Appl. No. 13/667,809, filed Nov. 2, 2012, dated Dec. 4, 2014, 10 pgs.
Schonleber; International Preliminary Report on Patentability for serial No. PCT/IB2011/052048 filed May 10, 2011, dated Nov. 22, 2012, 7 pgs.
Michelt, Berthold; Applicant Initiated Interview Summary for U.S. Appl. No. 14/307,481, filed Jun. 17, 2014, dated Jul. 1, 2016, 3 pgs.
Michelt, Berthold; Applicant Interview Summary for U.S. Appl. No. 14/307,481, filed Jun. 17, 2014, dated Nov. 20, 2015, 3 pgs.
Michelt, Berthold; Issue Notification for U.S. Appl. No. 14/307,481, filed Jun. 17, 2014, dated Nov. 22, 2016, 1 pg.
Michelt, Berthold; Non-Final Office Action for U.S. Appl. No. 14/307,481, filed Jun. 17, 2014, dated Aug. 26, 2015, 41 pgs.
Schonleber; International Search Report and Written Opinion for serial No. PCT/IB2011/052048 filed May 10, 2011, dated Sep. 21, 2011, 12 pgs.
Michelt, Berthold; Final Office Action for U.S. Appl. No. 14/307,481, filed Jun. 17, 2014, dated Feb. 12, 2016, 24 pgs.
Michelt, Berthold; Notice of Allowance for U.S. Appl. No. 14/307,481, filed Jun. 17, 2014, dated Jul. 25, 2016, 20 pgs.
Chinese Office Action for serial No. 201380059958.1, filed Nov. 14, 2013, dated Oct. 9, 2016, 11 pgs.
Schonleber, Martin; Notice of Allowance for U.S. Appl. No. 14/713,150, filed May 15, 2015, dated Feb. 9, 2017, 16 pgs.
Schonleber, Martin; Notification for U.S. Appl. No. 14/713,150, filed May 15, 2015, dated May 24, 2017; 1 pg.
Schonleber, Martin; Non-Final Office Action for U.S. Appl. No. 14/713,150, filed May 15, 2015, dated Sep. 6, 2016; 50 pgs.
Schonleber, Martin; Issue Notification for U.S. Appl. No. 15/588,021, filed May 5, 2017, dated May 9, 2018, 1 pg.
Schönleber, Martin; Notice of Allowance for U.S. Appl. No. 15/588,021, filed May 5, 2017, dated Feb. 15, 2018, 33 pgs.
Schönleber, Martin; Ex Parte Quayle Action for U.S. Appl. No. 15/433/173, filed Feb. 15, 2017, dated Aug. 23, 2018, 30 pgs.
Schonleber, Martin; International Search Report and Written Opinion for PCT/IB2013/060127, filed Nov. 14, 2013, dated Mar. 21, 2014, 27 pgs.
Precitec Optronic GmbH; International Search Report and Written Opinion for serial No. PCT/IB2014/062290, Filed Jun. 17, 2014, dated Sep. 22, 2014, 20 pgs.
German Examination Report for serial No. 102012111008.5, filed Nov. 15, 2012, dated Jun. 19, 2013, 17 pgs.

(56) References Cited

OTHER PUBLICATIONS

Precitec Optronik GmbH; Notice of Preliminary Rejection for Korean application No. 10-2018-0134156, dated Jun. 19, 2019, 11 pgs.

* cited by examiner

OPTICAL MEASURING DEVICE

CROSS-REFERENCE TO RELATED APPLICATION

This application claims the benefit of German Patent Application No. DE 10 2018 130 901.5, filed on Dec. 4, 2018, which is hereby specifically incorporated by reference herein in its entirety.

FIELD OF THE INVENTION

This disclosure relates to an optical measuring device, in particular an optical chromatic measuring device for measuring an object.

BACKGROUND INFORMATION

Optical measuring devices for measuring objects are known. A measuring instrument for determining the surface and thickness of objects comprising a polychromatic light source and an optical processor part having a dispersive component that disperses chromatically in a non-axial direction optical radiation directed at the object to be measured is known from EP 2 076 733 B1. In this device different wavelengths of the optical radiation are focused in the direction of the normal of the surface of the object at different heights. A second processor part for optical radiation directs light, which is reflected by the measurement object in the mirror-reflection direction, towards a detector, which is configured to determine a wavelength of maximum intensity in order to determine a surface height.

SUMMARY OF THE INVENTION

The object of the invention is to specify an improved measuring device for measuring an object.

One aspect of the disclosure proposes a measuring device comprising a light source that emits a plurality of wavelengths and whose light is directed by a first confocal diaphragm into an optical illuminating/imaging system. This optical illuminating/imaging system comprises a first splitting optical element, which is designed as a prism or a grating. The first splitting optical element splits the light dependent on wavelength, i.e. light of different wavelengths hitting the splitting optical element at the same angle leaves the splitting optical element at different angles. In the case of a prism this is due to dispersion; in the case of a grating the first or a higher order of diffraction (positive or negative orders of diffraction) is used as the optical output and is split spectrally.

In the process, the light enters the first splitting optical element collimated for all wavelengths. This is possible only if no element with a clearly wavelength-dependent focal length, in particular no lens or lens combination with marked chromatic aberration, is arranged between the light source and the first splitting optical element.

The optical illuminating/imaging system also comprises a first lens system having at least one first lens. The first lens system is spatially separated from the first splitting optical element; they are two separate elements. The first lens system is characterised by the fact that its effective focal length changes significantly for different wavelengths. This property is known as axial chromatic aberration.

The light is focused by the optical illuminating/imaging system, focusing locations, in particular focus points or focus lines, of different wavelengths being formed at different locations. The locations lie along a measurement segment, in particular a line segment or area segment, which forms an acute angle with the axis of symmetry of the first lens system.

The region of the line segment or area segment on which the focus points or focus lines lie represents the measurement range of the measuring device. Any object that intersects with the line segment and reflects at least a part of the light can be measured.

The distance from the focus points to the lens system varies depending on wavelength due to the axial chromatic aberration of the first lens system. Without significant axial aberration the focus points would be aligned approximately perpendicular to the axis of symmetry.

The measuring device also comprises an optical detection/imaging system that is spatially separated from the optical illuminating/imaging system. The spatial separation allows the use of smaller, lighter optical components. The optical detection/imaging system is configured to receive light reflected by the object from a direction different to the direction from which the illuminating light hits the object and to image the focus points of all the wavelengths used on a second confocal diaphragm.

The second confocal diaphragm has the effect of suppressing light of wavelengths that hit the measurement object out of focus and are not therefore imaged exactly on the second confocal diaphragm, and thus of reducing background and improving the signal-to-noise ratio.

The measuring device also comprises a detector that is configured to acquire the intensity of the light passing through the second diaphragm.

Due to the significant axial aberration, when the imaging quality of the focussing locations or focus points is good the angle of light incidence can be increased so as to efficiently suppress or reduce so-called shadowing effects.

The features of the invention therefore present the advantage that the average angle of incidence of the measuring light on the measurement object is steeper, thereby reducing shadowing.

On the other hand, the angle of incidence is also not perpendicular to the object and it is therefore possible to run the optical illuminating/imaging system and the optical detection/imaging system separately and for the direction of incidence or direction of reception to vary from the direction in which the focus points are aligned. As a result, light from wavelengths that are not focused on the surface of the object are not merely imaged out of focus on the second confocal diaphragm but are also offset laterally. This means that less light of those wavelengths that are out of focus on the object passes through the second confocal diaphragm and that the background continues to be suppressed. The resolution of the measuring device is determined by the resolution of the objective used (optical illuminating/imaging system and optical detection/imaging system) alone.

On average, the line segment on which the focus points lie preferably intersects with the surface of the object to be measured at right angles or almost at right angles. This has the advantage that the measurement is not distorted. At right angles the coordinate values parallel to the surface (x/y coordinates) are constant for each focus point and depend neither on the height above the surface (z) nor on the wavelength. This means that the topography of the surface can be determined directly in a Cartesian coordinate system without further conversion. As a result no surface distortion occurs in the measurement.

In a symmetrical arrangement of the optical illuminating/imaging system and the optical detection/imaging system, a perpendicular arrangement of the line segment to the surface also has the advantage of higher luminous efficacy.

Advantageous developments of the invention are described below.

The light source preferably emits a continuous spectrum. The spectrum emitted is particularly preferably in the visible light range (approx. 400-800nm) or in the infrared range.

The focal length of the first lens system for the smallest wavelength of the light source differs from the focal length of the first lens system for the largest wavelength of the light source by an amount δf. The quotient of δf and the focal length of the mean wavelength $f_0$ is preferably greater than 5%. This level of chromatic aberration can be regarded as significant.

$$\frac{\delta f}{f_o} > 5\%$$

The distance between the focus point of the smallest wavelength and the focus point of the largest wavelength of the light source defines the measurement range of the measuring device. There is a particularly suitable measurement range for each application. The chosen measurement range is, for example, advantageously greater than the largest structures or expected height differences on the object to be measured. At the same time, the chosen measurement range should not be too large as there is generally an inverse relationship between measurement range and resolution. The measurement range in this application is preferably in the range of a few millimeters or less than one millimeter.

The measurement range is predetermined by moving the focus points of the different wavelengths laterally and axially in relation to the axis of symmetry of the first lens system. Axial movement and lateral movement preferably differ by less than a factor of 2 and are particularly preferably roughly the same. In other words, both axial and lateral movement are of the same order of magnitude as the measurement range itself.

The lateral and axial movements of the focus point positions are advantageously chosen such that the line segment that passes through the focus point positions of the different wavelengths has an angle of less than 60° to the axis of symmetry of the first lens system. It is particularly advantageous for the angle to be less than or equal to 45°. This is particularly suitable for avoiding shadowing and allows a compact design.

It is also preferable for the line segment that runs through the focus points of the different wavelengths to have an angle greater than 30° to the axis of symmetry of the first lens system.

It is particularly preferable for the focal length of the first lens system for the smallest wavelength of the light source to differ from the focal length of the first lens system for the largest wavelength of the light source by an amount that corresponds roughly to a pre-determined measurement range of the measuring device.

To achieve sufficient focal spot dislocation (chromatic aberration) at least one of the lenses in the first lens system advantageously has an Abbe number of $v_d$<40.

The optical illuminating/imaging system preferably comprises a collimator lens arranged between the light source and the first splitting optical element. This collimator lens is preferably achromatic, i.e. the focal length for different wavelengths is either the same or differs only slightly. This allows a collimated beam path of all wavelengths. The collimator lens can alternatively be relocated by several lenses which, when seen together, have the properties set out above.

It is also possible to provide the collimator lens with chromatic aberration such that the axial movement of the spots is divided between the collimator lens and the first lens system. This means that the beam path is not perfectly collimated for all wavelengths by the first splitting optical element.

It is advantageous to ensure that the line segment on which the focus points lie is straight by matching the wavelength dependency of the focal length of the first lens system and the wavelength dependency of the splitting of the first splitting optical element to one another. This is achieved particularly advantageously by considering a mathematical relationship between the wavelength dependencies (see explanations of FIGS. 3a and 3b). Preferably either a prism is selected as the first splitting optical element in combination with a first lens system comprising one or more dispersive lenses, or a grating is chosen as the splitting optical element in combination with at least one diffraction lens in the first lens system. Thus either dispersive elements are used together or diffractive elements are used together. This makes it possible to ensure that the axial and lateral movements of the focus points match up (i.e. a mathematical relationship between movement and wavelength equal up to a proportionality factor is sufficient) such that the line segment is straight.

According to a preferred embodiment of the invention, the optical detection/imaging system comprises a second splitting optical element - prism or grating - and a second lens system. This allows imaging on the second confocal diaphragm in a particularly simple manner. In principle, the beam path here corresponds to the beam path of the optical illuminating/imaging system but with the elements in reverse order. Here - as a result of the reversed order - the second splitting optical element has the effect of reversing the splitting caused by the first splitting optical element. Light that comes from one of the focus points of the optical illuminating/imaging system and has the wavelength corresponding to the focus point is therefore focused by the optical detection/imaging system on the same location, advantageously on the opening of second confocal diaphragm, for all wavelengths.

The second splitting optical element is preferably identical in construction to the first splitting optical element. In particular, the second splitting optical element is a prism if the first splitting optical element is a prism and is identical in construction to it and the second splitting optical element is a grating if the first splitting optical element is a grating and is identical in construction to it.

The second lens system is preferably identical in construction to the first lens system.

It is particularly advantageous if the entire optical illuminating/imaging system and the optical detection/imaging system are identical in construction. In such an arrangement they are mirror symmetrical and the detection beam path is therefore identical to the illuminating beam path.

For this embodiment it is advantageous for the line segment on which the focus points are aligned to be at least approximately perpendicular to the object to be measured such that the entire arrangement can be symmetrical.

The line segment on which the focus points are aligned advantageously lies on the angle bisector between the illuminating beam path and the detection beam path.

According to a preferred embodiment of the invention, the detector comprises a spectrometer and is configured to determine intensity maxima of the wavelengths and from them to calculate distance values of the object.

A relationship is particularly preferably established between the wavelength of the intensity maximum and the distance values. This is advantageously achieved by calibrating the measuring device. This relationship is used to determine the distance values.

Due to the confocal structure of the measuring device, the wavelengths focused on the object to be measured are imaged again sharply on the opening of the second confocal diaphragm. As a result, it is mostly the intensity of this wavelength that passes through the diaphragm and so the intensity maximum corresponds to the wavelength focused on the object. This makes it possible to draw conclusions as to the position of the surface of the object in relation to the focus positions.

In a preferred embodiment of the invention, the first confocal diaphragm and the second confocal diaphragm are both orifice diaphragms, i.e. they have a circular opening with a small cross-section. In order to ensure good lateral resolution the diameter is preferably less than 100μm. The diameter is particularly preferably less than 50μm. This results in a measurement at one single point on the surface of the object.

In an alternative embodiment of the invention, the first confocal diaphragm and the second confocal diaphragm are both orifice diaphragms, i.e. they have a slot-like opening. In this embodiment focus lines, rather than focus points, are formed at different locations. Rather than along a line segment, they lie on an area segment and have one dimension that corresponds to the long edge of the slit diaphragm and another other dimension that has all the properties of the line segment described above. All the features described in relation to focus points and a line segment are equally applicable to focus lines and an area segment. The optical illuminating/imaging system is designed such that the focus lines of different wavelengths are formed at different locations, these locations lying along an area segment which forms an acute angle to the axis of symmetry of the first lens system. The measuring device is designed to measure an object that intersects with the area segment. The optical detection/imaging system is configured to image the focus lines of all wavelengths on the second confocal diaphragm.

The slit diaphragms are oriented such that the first confocal diaphragm is imaged on the second confocal diaphragm. The slit diaphragms are advantageously oriented such that splitting is carried out by the first splitting optical element at right angles to the longer dimension of the slit.

The lateral resolution (i.e. in directions at right angles to the height measurement) of this arrangement is dictated by the resolution of the objectives (optical illuminating/imaging system and optical detection/imaging system) used alone as only the region of the focus lines is imaged. There is no problem with cross-talk between individual pixels.

Orifice openings arranged in a row can be regarded as a variant of this embodiment.

In a preferred embodiment of the invention, the detector comprises a sensor that measures the intensity passing through the second confocal diaphragm in a spatially resolved manner. In this embodiment there is particularly preferably no spectral splitting within the detector and an image of the total intensity is therefore acquired at the location of the second confocal diaphragm. An image of the surface of the object is thus acquired with increased depth of focus due to chromatic splitting. In addition, the sensor is also advantageously configured to spatially resolve the incident light location. In the process intensities of incident light are determined at several locations by a plurality of individual pixels, for example. In this way the spatial resolution of the incident light along at least one dimension is possible, the spatially resolved dimension preferably being that corresponding to the longer edge of the slit diaphragm.

Matrix detectors, i.e. sensors that permit the resolution of incident light in two dimensions, are preferably used.

In a further preferred embodiment of the invention, the detector comprises a beam splitter that directs one part of the light to a first detector part and a second part of the light to a second detector part. Particularly preferably, the light is spectrally split and the wavelength of maximum intensity determined in the first detector part while in the second detector part no spectral splitting takes location and a total intensity image is produced. The total intensity image obtained by the second detector part and the height data obtained at the same time for the same measurement range by the first detector part are combined, e.g. represented superimposed by means of a display device. It is particularly preferably possible to evaluate and output both height data and a more accurately resolved total intensity image in the plane at right angles to the height.

In order to exploit the advantages which the slit diaphragm presents in comparison to a grid of pinhole diaphragms, the light reflected by the measurement object is preferably propagated by free space optics between the measurement object and the detector. It is also preferable for the light to propagate from the light source to the measurement object by free space optics. This has the added advantage that the measuring device can be of more robust construction and is less expensive to construct as well as being largely independent of temperature.

According to a preferred embodiment of the invention, the beam splitter is a cube beam splitter that particularly preferably comprises two interconnected prisms with a beam splitter surface running between them.

The object to be measured and the measuring device can advantageously be moved relative to one another, preferably in two or three dimensions. This movement is preferably automatic. Thus it is possible to scan the object in order to measure a plurality of points.

BRIEF DESCRIPTION OF THE DRAWINGS

Advantageous exemplary embodiments of the invention are explained below with reference to the drawings.

DETAILED DESCRIPTION

Figure 1:
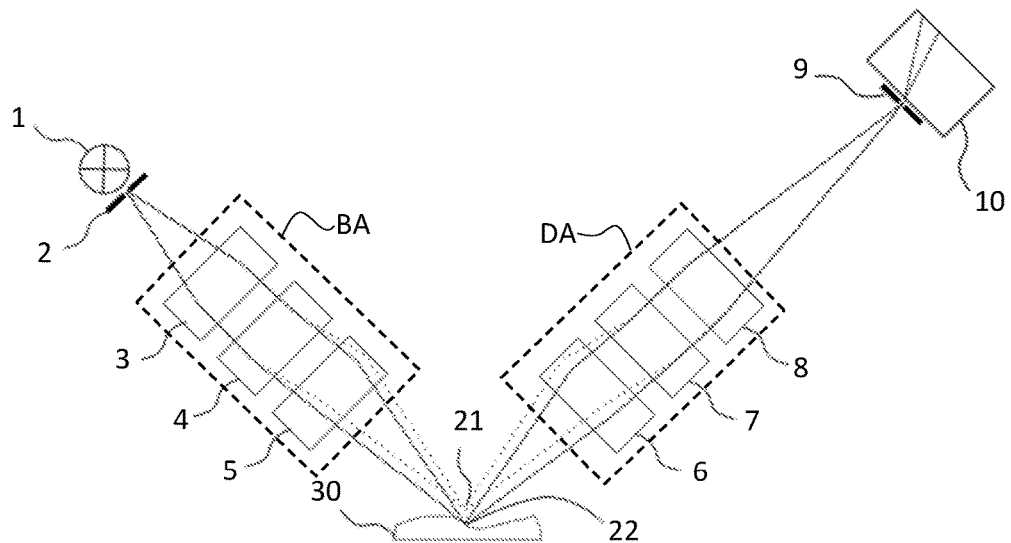
FIG. 1 shows: a schematic drawing of an exemplary embodiment of the chromatic confocal measuring device.

FIG. 1 shows a schematic drawing of an exemplary embodiment of the chromatic confocal measuring device.

A light source 1 emits a beam of a plurality of wavelengths. It preferably emits a continuous spectrum, which particularly preferably lies within the visible range. The light source is, for example, an LED or a halogen lamp or a light source containing laser-excited phosphor or a supercontinuum light source.

The light passes through a first confocal diaphragm 2. The diaphragm has an opening that is preferably circular with a small diameter (orifice diaphragm). Alternatively, the diaphragm can have a slot-shaped opening with the slot broadening out into the drawing plane.

An optical illuminating/imaging system (BA) of the measuring device comprises at least one collimator lens 3, a first splitting optical element (first prism or first grating) 4 and a first lens system 5 with at least one first lens. These elements are spatially separated from one another.

The first lens system 5 is flawed by a marked chromatic axial aberration such that the effective focal length $f(\lambda)$ differs significantly for different wavelengths $\lambda$. The effective focal length here is the focal length of the whole system. It can be advantageous to use a plurality of lenses in sequence in the lens system instead of a single lens as this permits chromatic aberration to be set precisely.

The optical illuminating/imaging system BA causes the first diaphragm 2 to be imaged at a focus point 21 by light of a first wavelength passing through the optical illuminating/ imaging system, while this same diaphragm 2 is imaged by light of another wavelength by the optical illuminating/ imaging system at another location 22. According to the invention, the locations are aligned along a line segment. Here the line segment forms an acute angle with the axis of symmetry of the first lens system 5. Without the chromatic aberration of the first lens system 5, the line segment would be approximately perpendicular to the axis of symmetry since the splitting optical element 4, being a prism or grating, can only split the focus positions at right angles to the optical axis.

If a slot-shaped confocal diaphragm 2 is used, the optical illuminating/imaging system BA causes the first diaphragm 2 to be imaged at a focus line 21, which is extended into the paper plane, by light of a first wavelength, which passes through the optical illuminating/imaging system. This same diaphragm 2 is imaged on another focus line 22 by light of another wavelength by the optical illuminating/imaging system. According to the invention, the focus lines are aligned along an area segment. The area segment is generated on one hand by the spatial extension of each focus line and on the other by the different positions of the focus lines for different wavelengths. Here the area segment forms an acute angle with the axis of symmetry of the first lens system 5. More specifically, the area segment consists of a series of line segments, each of which corresponds to an image of a point of the slot diaphragm. Each of these line segments forms an acute angle with the axis of symmetry of the first lens system.

An object 30 to be measured is arranged in the region of the focus positions 21 and 22, i.e. within the measurement range of the measuring device. The object 30 reflects at least a part of the light. Reflected light from a spatial direction different to the direction of incidence is captured by the optical detection/imaging system DA. The optical illuminating/ imaging system and the optical detection/imaging system are spatially separated systems.

The optical detection/imaging system preferably comprises a second lens system 6, a second splitting optical element (second prism or second grating) 7 and a focusing lens 8. The entire optical detection/imaging system is configured to image light that has been focused on the surface of the object 30 and reflected by it onto a second diaphragm 9. The second diaphragm 9 serves as a second confocal diaphragm; it is confocal to the first diaphragm.

Light passing through the second diaphragm 9 is captured by a detector 10.

Figure 2:
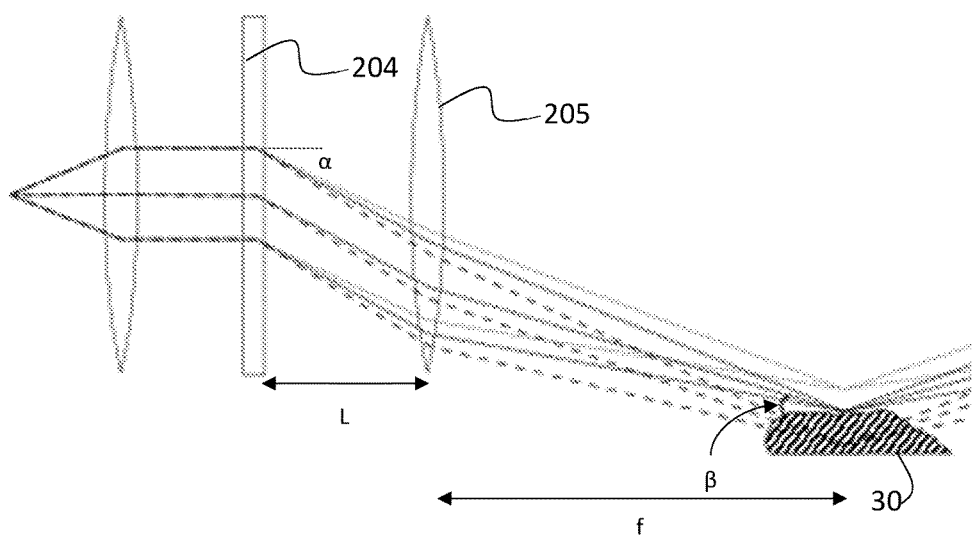
FIG. 2 shows: an optical illuminating/imaging system of a measuring device known from the prior art.

FIG. 2 shows the optical illuminating/imaging system of a generic arrangement of a measuring device known from the prior art for highlighting so-called shadowing effects. In this arrangement the light is deflected laterally by a prism 204 and focused by a lens 205. The lens 205 has no or very little chromatic aberration and the focus positions are therefore aligned approximately perpendicular to the axis of symmetry of the lens. The angle of incidence $\beta$ on the measurement object 30 is very small.

As shown in FIG. 2, the mean angle of incidence to the surface of the center wavelength on the object for a measuring instrument of this kind can be estimated at:

$$\beta(\lambda_0) \approx \alpha(\lambda_0)\left(1 - \frac{L}{f}\right).$$

Here $\alpha(\lambda_0)$ is the angle of diffraction for the center wavelength $\lambda_0$ caused by the dispersive components, L is the distance between the dispersive components and the focusing element and f is the focal length of the focusing element. This means that $\beta$ is always less than a and that the angle of incidence on the object is necessarily relatively shallow.

To achieve large angles $\beta(>30°)$ the angle a between the incident light beam and the optical axis of the focusing lens must reach values of $>30°$. This is not practicable, however, since the optical imaging quality is drastically impaired at such large tilt angles combined with a high blurring of the focus point, which has a direct negative effect on the lateral and axial resolution capacity of the measuring device.

On the other hand, large angles $\beta$ are desirable since a shallow angle of incidence frequently leads to shadowing on rough objects and so impairs measurement quality. In addition, such a structure is necessarily large and has to be located close to the measurement object.

Figure 3A:
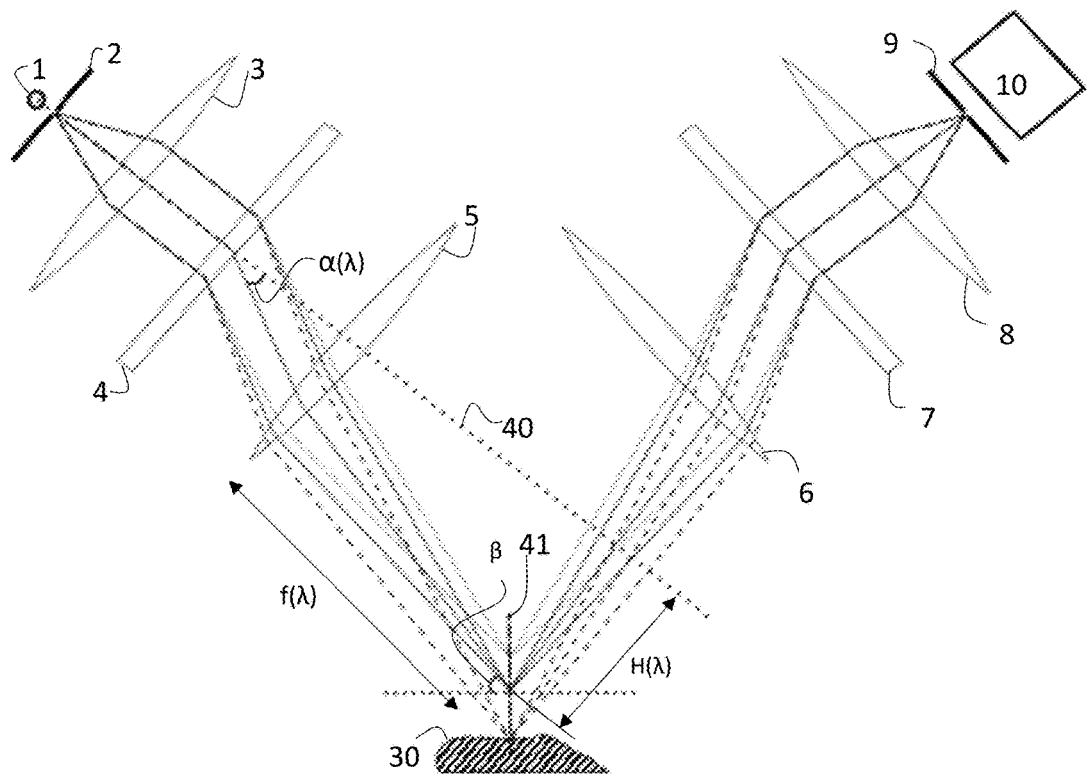
FIG. 3a shows: a preferred embodiment of the invention.

FIG. 3a shows the geometrical parameters of a preferred exemplary embodiment of the invention.

Here $\alpha(\lambda)$ denotes the angle between the beam hitting the first lens system and the axis of symmetry 40 of the first lens system 5. The angle $\alpha(\lambda)$ is dependent on wavelength.

In the exemplary embodiment shown in FIG. 3a, the axis of symmetry of the lens 3 is also the axis 40 and the axis of symmetry 40 also runs through the opening of diaphragm 2 such that the angle $\alpha(\lambda)$ simultaneously corresponds to the wavelength-dependent angle of deflection of the first splitting optical element. In the case of a prism, this is the angle of dispersion, in the case of a grating it is the angle of diffraction of the first (or higher) positive or negative diffraction order.

The wavelength-dependent focal length of the first lens system is denoted by $f(\lambda)$.

The distance H between the extended axis of symmetry 40 of the first lens system 5 and the focus point of a wavelength $\lambda$ is calculated as $$H(\lambda) \approx f(\lambda) * \tan(\alpha(\lambda)).$$

For the focus points to lie on a line segment, there must be a condition for the wave-length-dependent focal length $f(\lambda)$ of the first lens system 5 taking into account the pitch of the line segment c and an offset $f_0$.

$$H(\lambda) = c * f(\lambda) - f_0$$

$$f(\lambda) * \tan(\alpha(\lambda)) = c * f(\lambda) - f_0$$

$$f(\lambda) = \frac{f_0}{(c - \tan(\alpha(\lambda)))}$$

There is therefore a relationship between the focal length $f(\lambda)$ and the angle of dispersion $a(\lambda)$ and the pitch c. The offset $f_0$ is the working distance between the optical illuminating/imaging system and the object.

In most applications the measurement range, and therefore $H(\lambda)$, is small in comparison to the mean focal length. It is therefore possible to apply the approximation $$H(\lambda) \approx f_0 * \tan(\alpha(\lambda))$$

and to obtain:

$$f(\lambda) = \frac{f_0}{c}(1 + \tan(\alpha(\lambda))) \approx \frac{f_0}{c}.$$

This approximately disassociates the axial movement and the lateral movement of the focus positions. Here the lateral movement relative to the axis 40 is determined from the wavelength dependency of the angle of dispersion, while the axial movement towards the axis 40 is determined from the wavelength dependency of the focal length of the first lens system 5.

A linearity of the alignment of the focus positions is thus produced in that the angle of dispersion is approximately proportional to the wavelength, i.e. linear:

$$\alpha(\lambda) = c_1 \lambda$$

and the wavelength dependency $f(\lambda)$ of the focal length of the first lens system 5 is also approximately linear.

The pitch directly influences the angle of incidence $\mu$ on the object:

$$\mu(\lambda) = 90° - \operatorname{atan}(c) + \alpha(\lambda).$$

The first lens system 5 is advantageously designed such that an angle of deflection $\alpha(\lambda)$ (angle of dispersion or angle of diffraction) predetermined by the prism or grating 4 used is taken into account and a desired angle of incidence of the center wavelength $\beta_0$ is achieved.

This means that by an appropriate choice of effective chromatic aberration of the first lens system an additional degree of freedom is introduced, which in turn permits a choice of angle of incidence.

To put it another way, with a fixed working distance $f_0$ and a predetermined measurement range $H(\lambda)$, the angle of deflection $\alpha(\lambda)$ is set. The angle of incidence $\beta_0$ of the center wavelength can then also be set as an independent value using the degree of freedom of the chromatic axial aberration $f(\lambda)$.

The chosen angle of incidence $\beta_0$ of the center wavelength is advantageously between approx. 30° and 60° since this allows a small amount of shadowing due to irregularities on the object. The angle is advantageously chosen dependent on the expected roughness of the measurement object.

Figure 3B:
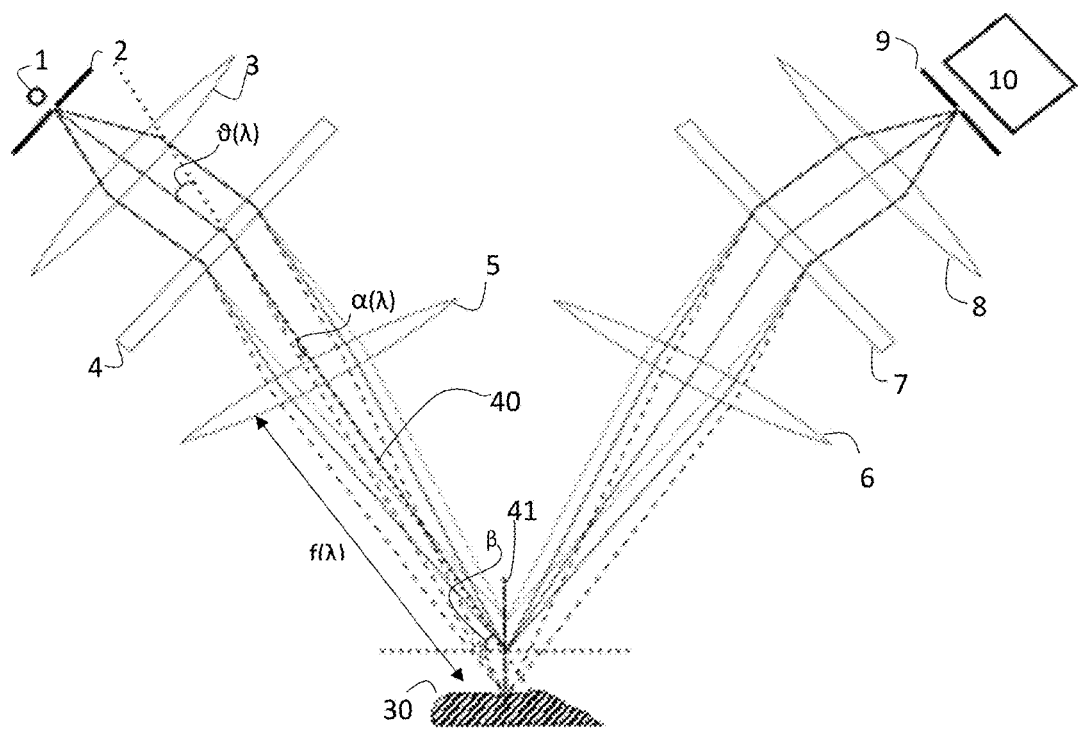
FIG. 3b shows: a further preferred embodiment of the invention.

In a further preferred exemplary embodiment of the invention, which is shown in FIG. 3b, the first lens system 5 is arranged inclined towards the lens 3 and to the splitting optical element 4. The axis of symmetry 40, to which all angles relate, also denotes the axis of symmetry of the first lens system 40, the lens 3 and the first diaphragm 2 being arranged inclined and decentered in relation to it.

The elements are particularly preferably arranged inclined in relation to one another such that the centre wavelength hits along the axis of symmetry 40 of the first lens system 5 ($\alpha(\lambda_0) = 0$). This results in fewer imaging errors than a more angled and/or decentred incidence.

The relationship $$f(\lambda) = \frac{f_0}{(c - \tan(\alpha(\lambda)))} \text{ or } f(\lambda) \approx \frac{f_0}{c}$$

continues to apply. Now, however, $\alpha(\lambda)$ is no longer the angle of deflection of the first splitting optical element 4 but has been reduced by the relative angle of inclination between the first splitting optical element 4 and the lens system 5. The angle of deflection of the first splitting optical element 4 is denoted as $\vartheta(\lambda)$ in FIG. 3b. $\alpha(\lambda) = \vartheta(\lambda) - \vartheta_0$. $\vartheta_0$ is particularly preferably the angle of deflection of the centre wavelength.

Figure 4:
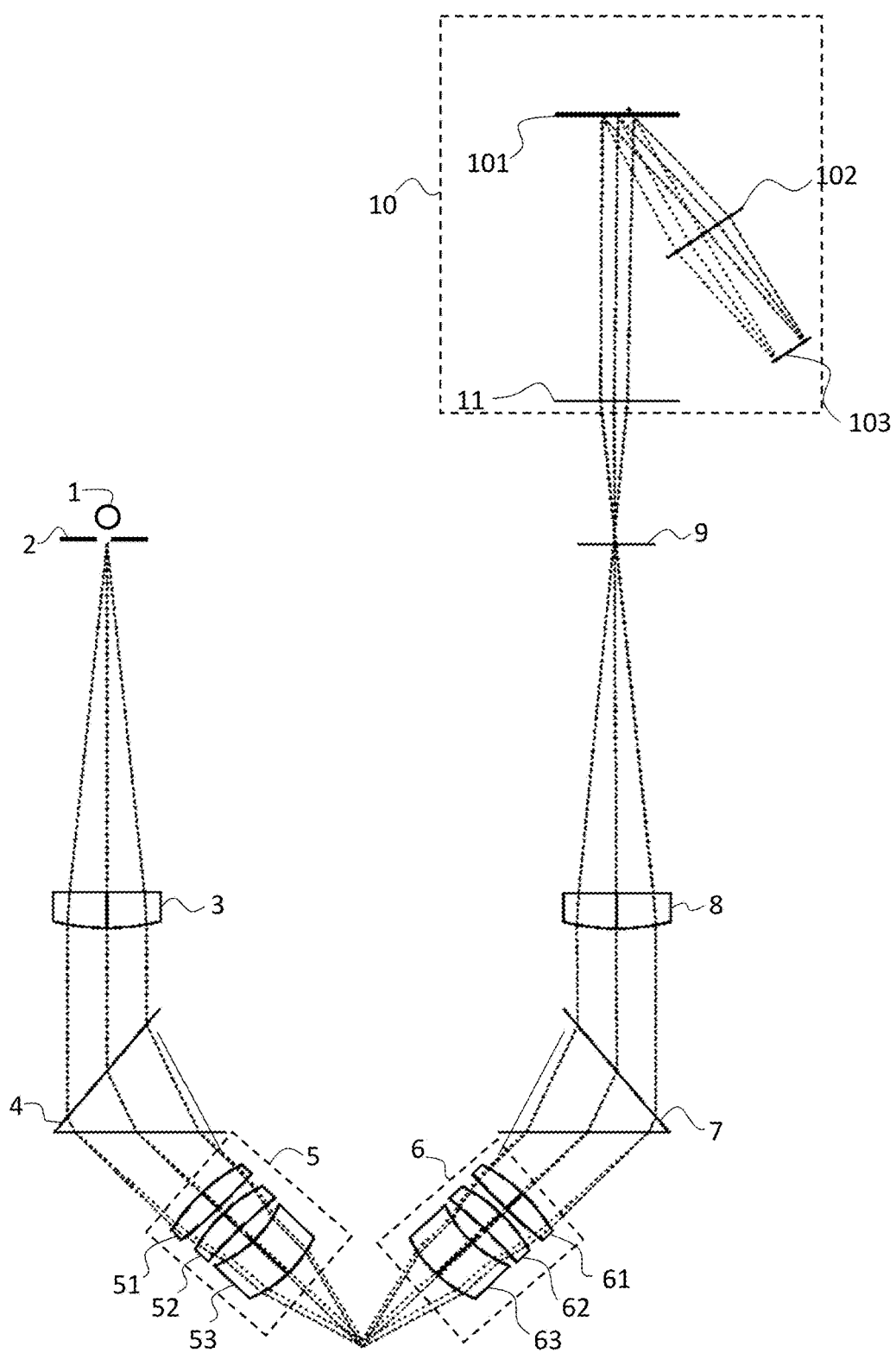
FIG. 4 shows: a further preferred embodiment of the invention.

FIG. 4 shows an exemplary embodiment of the invention.

It shows the elements of the chromatic measuring device as described in relation to FIG. 1 with the first splitting optical element 4 taking the form of a first prism and the second splitting optical element 7 also being designed as a prism.

The first lens system 5 consists of a group of three successive lenses 51, 52 and 53. The middle lens 52 has an Abbe number $v_d < 40$. The other lenses 51, 53 serve to correct the imaging.

The second lens system 6 also consists of three successive lenses 61, 62 and 63, which correspond to the lenses of the first lens system 5.

Following the second confocal diaphragm 9 comes a first detector lens that collimates the beams, which are then split spectrally. This is achieved by a spectrometer consisting of a diffraction grating 101, a second detector lens 102, which focuses the beams, and a sensor 103, which is designed as a line sensor and acquires the intensities of the spectrally split light.

In a further preferred embodiment of the invention, the diffraction grating of the spectrometer is relocated by a prism (prism spectrometer). It should be seen as advantageous to use a prism spectrometer where prisms are used as the first splitting element and the second splitting element, while where gratings are used as the first splitting element and the second splitting element a grating is inserted into the spectrometer. This has the advantage that the relationship between spectrometer pixels and the height value is linear. The choice between a prism spectrometer and a diffractive spectrometer is possible for all embodiments that comprise a spectrometer.

Figure 5:
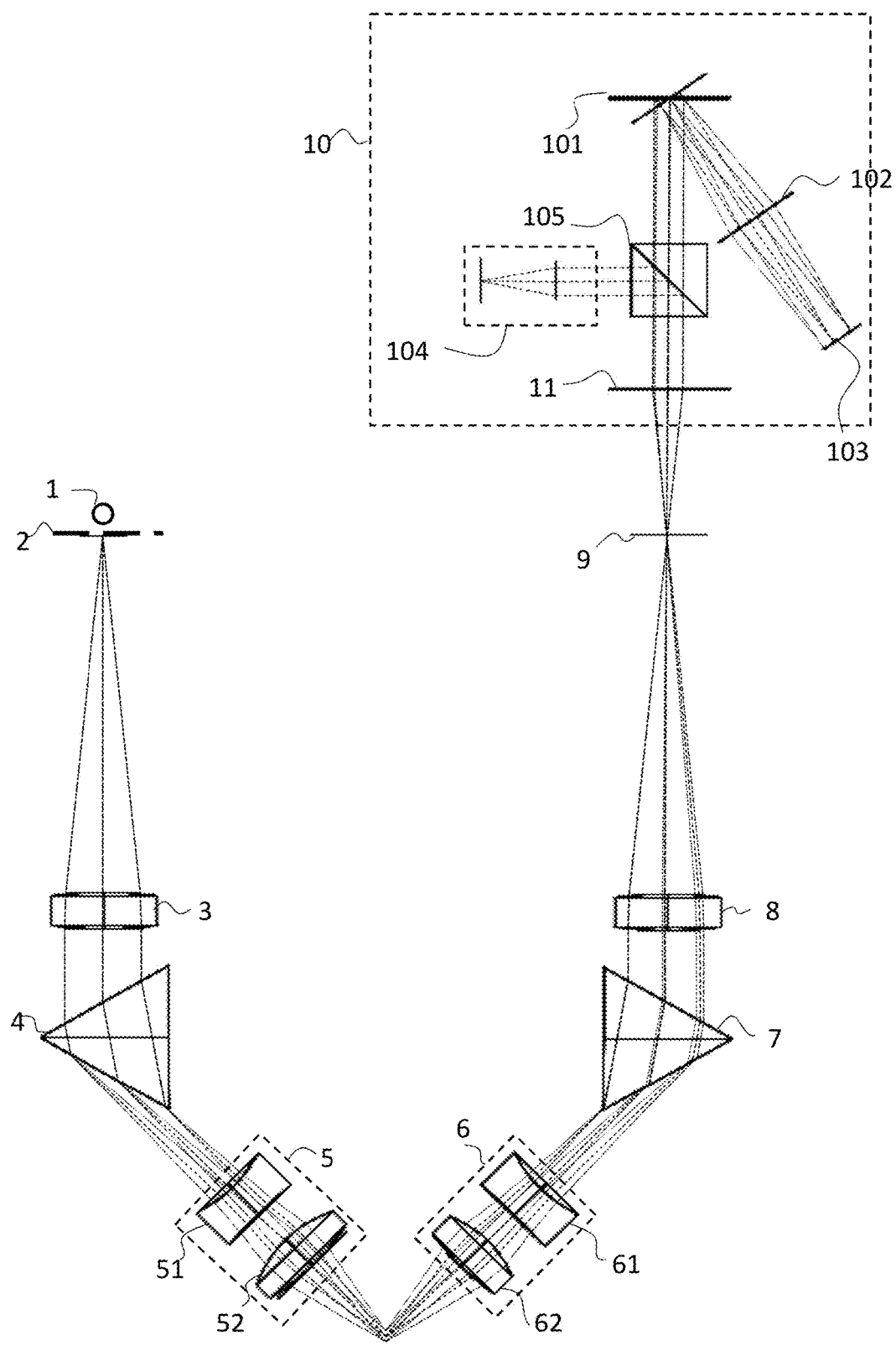
FIG. 5 shows: a further preferred embodiment of the invention.

FIG. 5 shows a further embodiment of the invention. The individual components shown in FIG. 5 can be exchanged and combined freely with the corresponding components shown in FIG. 4.

In contrast to FIG. 4, the first and second lens systems here each comprise two lenses (51 and 52 and 61 and 62).

Here, in addition to the spectrometer components, namely a diffraction grating 101, a lens 102 and a sensor 103, the detector 10 also comprises a cube beam splitter 105, which splits the light. While a first part is directed into the spectrometer and its intensity is determined depending on wavelength, the second part is directed into an image sensor 104, which does not split the spectral ranges and records a total intensity image.

The first confocal diaphragm 2 and the second confocal diaphragm 9 are preferably designed as slot diaphragms, their longer dimension oriented towards the drawing plane. This makes it possible to acquire a plurality of pixels simultaneously and thereby to acquire a large image region more quickly in one scan. The image sensor 104 makes it possible to record total intensity values along the slot. If a scan is carried out, the total intensity values recorded can be combined to form an image of the surface with improved depth of focus.

Examples of possible embodiments of the measuring device are detailed below.

EXAMPLES

1. A chromatic confocal measuring device comprising
   a light source (1) that emits light of a plurality of wavelengths, in particular a continuous spectrum, and
   a first confocal diaphragm (2) through which light from the light source (1) passes.
2. A measuring device according to the preceding example also comprising an optical illuminating/imaging system (BA) comprising at least one first splitting optical element (4).
3. A measuring device according to the preceding example 3, the optical element (4) taking the form of a prism or grating.
4. A measuring device according to any of the preceding examples 2 or 3, the light entering the first splitting optical element (4) collimated.
5. A measuring device according to any of the preceding examples 2 to 4, the optical illuminating/imaging system (BA) also comprising a first lens system (5) having at least one first lens.
6. A measuring device according to the preceding example 5, the first lens system (5) being spatially separated from the first splitting optical element (4).
7. A measuring device according to any of the preceding examples 5 or 6, the effective focal length (f(λ)) of the first lens system (5) being significantly different for different wave-lengths (λ).
8. A measuring device according to any of the preceding examples 2 to 7, the optical illuminating/imaging system (BA) being designed such that the focus points of different wave-lengths are formed at different locations.
9. A measuring device according to the preceding example 8, the locations lying along a line segment (41) that forms an acute angle to the axis of symmetry (40) of the first lens system (5).
10. A measuring device according to the preceding example 9, the measuring device being configured to measure an object (30) that intersects with the line segment (41) and reflects at least a part of the light.
11. A measuring device according to any of the preceding examples, the measuring device comprising an optical detection/imaging system (DA) that is spatially separated from the optical illuminating/imaging system (BA).
12. A measuring device according to the preceding example 11, the optical detection/imaging system (DA) being configured to receive light reflected by the object (30) only from a direction different from the direction from which the illuminating light hits the object.
13. A measuring device according to any of the preceding examples 11 or 12, the optical detection/imaging system (DA) being configured to image the focus points of all wave-lengths on a second confocal diaphragm (9).
14. A measuring device according to the preceding example 13, the measuring device comprising a detector (10) that is configured to record the intensity of the light passing through the second diaphragm (9).
15. A measuring device for measuring an object comprising:
    a light source (1) for generating a light having a plurality of wavelengths,
    an optical illuminating/imaging system (BA) designed such that light beams with different wavelengths can be focussed at different focussing locations in a measurement range along a measurement segment (41), and
    an optical detection/imaging system (DA) spatially separated from the optical illuminating/imaging system (BA) designed to acquire light reflected from a surface region of the object (30) to be measured that overlaps with the measurement range from a direction different from the direction from which the illuminating light hits the object.
16. A measuring device according to the preceding example 15, the optical illuminating/imaging system (DA) comprising:
    a first confocal diaphragm (2) connected downstream of the light source (1),
    a first splitting optical element (4) for chromatically splitting a light entering the first splitting optical element (4), and
    a first lens system (5) having a wavelength-dependent effective focal length (f(λ)) that is spatially separated from the splitting optical element (4).
17. A measuring device according to any of the preceding examples 15 or 16, the optical detection/imaging system (DA) being configured to image the focussing locations of different wavelengths onto a second confocal diaphragm (9).
18. A measuring device according to any of the preceding examples 15 to 17, the measuring device comprising a detector (10) connected downstream of the second confocal diaphragm (9) that is configured to acquire the intensity of the light passing through the second diaphragm (9).
19. A measuring device according to any of the preceding examples 15 to 18, it being possible to define the measurement segment (41) by means of the lateral movement and the axial movement of the focussing locations for different wavelengths in relation to an optical axis or the axis of symmetry of the first lens systems.
20. A measuring device for measuring an object comprising:
    a light source (1) for generating a light having a plurality of wavelengths,
    an optical illuminating/imaging system (BA) comprising:
    a first confocal diaphragm (2) connected downstream of the light source (1),
    a first splitting optical element (4) for the chromatic splitting of a light entering the first splitting optical element (4),
    a first lens system (5) spatially separated from the splitting optical element (4) with an effective focal length (f(λ)) dependent on wavelength, the optical illuminating/imaging system (BA) being designed such that light beams with different wavelengths can be focussed at different focussing locations in a measurement range along a measurement segment (41), and
    an optical detection/imaging system (DA) spatially separated from the optical illuminating/imaging system (BA) that is designed to acquire light reflected by the surface region of the object (30) to be measured that overlaps with the measurement range from a direction different to the direction from which the illuminating light hits the object, the optical detection/imaging system (DA) being configured to image the focussing locations of different wavelengths onto a second confocal diaphragm (9) and the measuring device comprising a detector (10) connected downstream of the second confocal diaphragm (9), which is configured to acquire the intensity of the light passing through the second diaphragm (9), characterised in that it is possible to define the measurement segment (41) by means of the axial movement and the lateral movement of the focussing locations for different wavelengths in relation to an optical axis or axis of symmetry of the first lens system.

21. A measuring device according to any of the preceding examples, the optical illuminating/imaging system (BA) being designed such that the axial movement and the lateral movement of the focussing locations can be coordinated to form a straight measurement segment (41) that forms an acute angle to the axis of symmetry of the first lens system measurement segment (41).

22. A measuring device according to any of the preceding examples, the axial movement and the lateral movement of focussing locations being essentially disassociated from one another or independently adjustable.

23. A measuring device according to any of the preceding examples, the optical detection/imaging system (DA) comprising a second lens system (6) and a second splitting optical element (7) to reverse the splitting caused by the first splitting element (4).

24. A measuring device according to example 23, characterised in that the second splitting optical element (7) is identical in construction to the first splitting optical element (4) and that the second lens system (6) is identical in construction to the first lens system (5).

25. A measuring device according to example 23 or 24, the optical detection/imaging system (DA) being designed such that the beam path of the optical detection/imaging system (DA) corresponds essentially to the beam path of the optical illuminating/imaging system (BA) in reverse order.

26. A measuring device according to any of the preceding examples, characterised in that the effective focal length of the first lens system (5) for the smallest wavelength of the light source (1) differs from the focal length of the first lens system for the largest wave-length of the light source (1) by an amount δf, the quotient of δf and the focal length of the first lens system (5) for the mean wavelength $f_o$ being more than 5%.

27. A measuring device according to any of the preceding examples, characterised in that the axial movement of the focussing locations is at least 0.1 times the lateral splitting of the focussing locations.

28. A measuring device according to any of the preceding examples, characterised in that the first lens system (5) comprises at least one lens with an Abbe number less than 40.

29. A measuring device according to any of the preceding examples, characterised in that the measurement segment (41) has an angle less than 60° and/or greater than 30°, in particular equal to 45°, to the axis of symmetry (40) of the first lens system (5).

30. A measuring device according to any of the preceding examples, characterised in that optical illuminating/ imaging system (BA) has a collimation lens connected downstream of the first diaphragm for collimating the light entering the splitting optical element (4).

31. A measuring device according to example 29, the collimation optics comprising an achromatic lens.

32. A measuring device according to any of the preceding examples, characterised in that the first splitting optical element (4) comprises a grating and the first lens system (5) comprises at least one diffractive lens.

33. A measuring device according to any of the preceding examples 1 to 31, characterised in that the first splitting optical element (4) comprises a prism and the first lens system (5) comprises at least one dispersive lens.

34. A measuring device according to any of the preceding examples, characterised in that the first lens system (5) is arranged inclined towards the first splitting optical element (4), in particular such that the mean wavelength hits the first lens system (5) parallel to the axis of symmetry (40) of the first lens system (5).

35. A measuring device according to any of the preceding examples, characterised in that the first confocal diaphragm (2) is a slit diaphragm, the focussing locations taking the form of focus lines, the measurement segment taking the form of an area segment and the focus lines being arranged along the area segment.

36. A measuring device according to any of the preceding examples, characterised in that the detector (10) comprises a spectrometer and is configured to determine the intensity maxima of the wavelengths and to calculate from them distance values of the object.

LIST OF REFERENCE NUMERALS

1 Light source
2 First confocal diaphragm
3 Collimator lens
4 First splitting optical element, first prism or first grating
5 First lens system
6 Second lens system
7 Second splitting optical element, second prism or second grating
8 Focusing lens
9 Second confocal diaphragm
10 Detector
11 First detector lens
21 First focus point
22 Second focus point
30 Object
40 Axis of symmetry of first lens system
41 Line segment
51 First lens of first lens system
52 Second lens of first lens system
53 Third lens of first lens system
61 First lens of second lens system
62 Second lens of second lens system
63 Third lens of second lens system
101 Spectrometer grating
102 Second detector lens
103 Sensor
104 Image sensor
105 Beam splitter
BA Optical illuminating/imaging system
DA Optical detection/imaging system
α Angle of dispersion
β Angle of incidence
f(λ) Focal length of first lens system

What is claimed is:

1. A chromatic confocal measuring device, comprising:
a light source that emits light of a plurality of wavelengths, in particular a continuous spectrum;
a first confocal diaphragm through which passes light from the light source; and
an optical illuminating or imaging system, comprising at least
   a first splitting optical element, which is designed as a prism or grating, the light entering the first splitting optical element collimated, and
   a first lens system having at least one first lens that is spatially separated from the first splitting optical element, an effective focal length of the first lens system differing for each different wavelength;
wherein the optical illuminating or imaging system is configured such that focus points of different wavelengths are formed at different locations, the different locations lying along a line segment that forms an acute angle to an axis of symmetry of the first lens system;
wherein the measuring device is configured to measure an object that intersects with the line segment and reflects at least a part of the light;
wherein the measuring device comprises an optical detection or imaging system spaced from the optical illuminating or imaging system;
wherein the optical detection or imaging system is configured to receive reflected light from the object only in a direction that differs from a direction in which illuminating light hits the object;
wherein optical detection or imaging system is further configured to image the focus points of all wavelengths on a second confocal diaphragm;
wherein the measuring device comprises a detector that is configured to record intensity of light passing through the second confocal diaphragm;
wherein a focal length of the first lens system for a smallest wavelength of the light source differs from a focal length of the first lens system for a largest wavelength of the light source by an amount $\delta f$, a quotient of $\delta f$ and a focal length of the first lens system for a mean wavelength $f_o$ being more than 5%.

2. The measuring device of claim 1, wherein axial splitting of focus point positions is at least 0.1 times lateral splitting of the focus point positions.

3. The measuring device of claim 1, wherein the first lens system comprises at least one lens having an Abbe number of less than 40.

4. The measuring device of claim 1, wherein the line segment that runs through focus point positions of the different wavelengths has an angle of between 60° and 30° to the axis of symmetry of the first lens system.

5. The measuring device of claim 1, wherein the optical illuminating or imaging system comprises a collimator lens that is arranged between the light source and the first splitting optical element and is achromatic.

6. The measuring device of claim 1, wherein the first splitting optical element is a grating and the first lens system comprises at least one diffractive lens.

7. The measuring device of claim 1, wherein the first lens system is arranged inclined towards the first splitting optical element, in particular such that a mean wavelength hits the first lens system parallel to the axis of symmetry of the first lens system.

8. The measuring device of claim 1, wherein the first confocal diaphragm is a slit diaphragm, whereby instead of forming focus points for each wavelength, focus lines are formed arranged along an area segment that forms an acute angle to the axis of symmetry of the first lens system.

9. The measuring device of claim 1, wherein the optical detection or imaging system comprises a second splitting optical element designed as a prism or grating and a second lens system.

10. The measuring device of claim 9, wherein the second splitting optical element is of identical construction to the first splitting optical element, and wherein the second lens system is of identical construction to the first lens system.

11. The measuring device of claim 1, wherein the detector comprises a spectrometer and is configured to determine intensity maxima of the wavelengths and to calculate from them distance values of the object.

12. The measuring device of claim 4, wherein the line segment that runs through the focus point positions of the different wavelengths has an angle of 45° to the axis of symmetry of the first lens system.

* * * * *